Dec. 1, 1970   L. H. FRANCIS ET AL   3,544,436
ELECTRODIALYSIS PROCESS AND APPARATUS
Filed March 27, 1969   5 Sheets-Sheet 1

INVENTORS
Leo H. Francis
Gerald J. Treleven

Attorneys

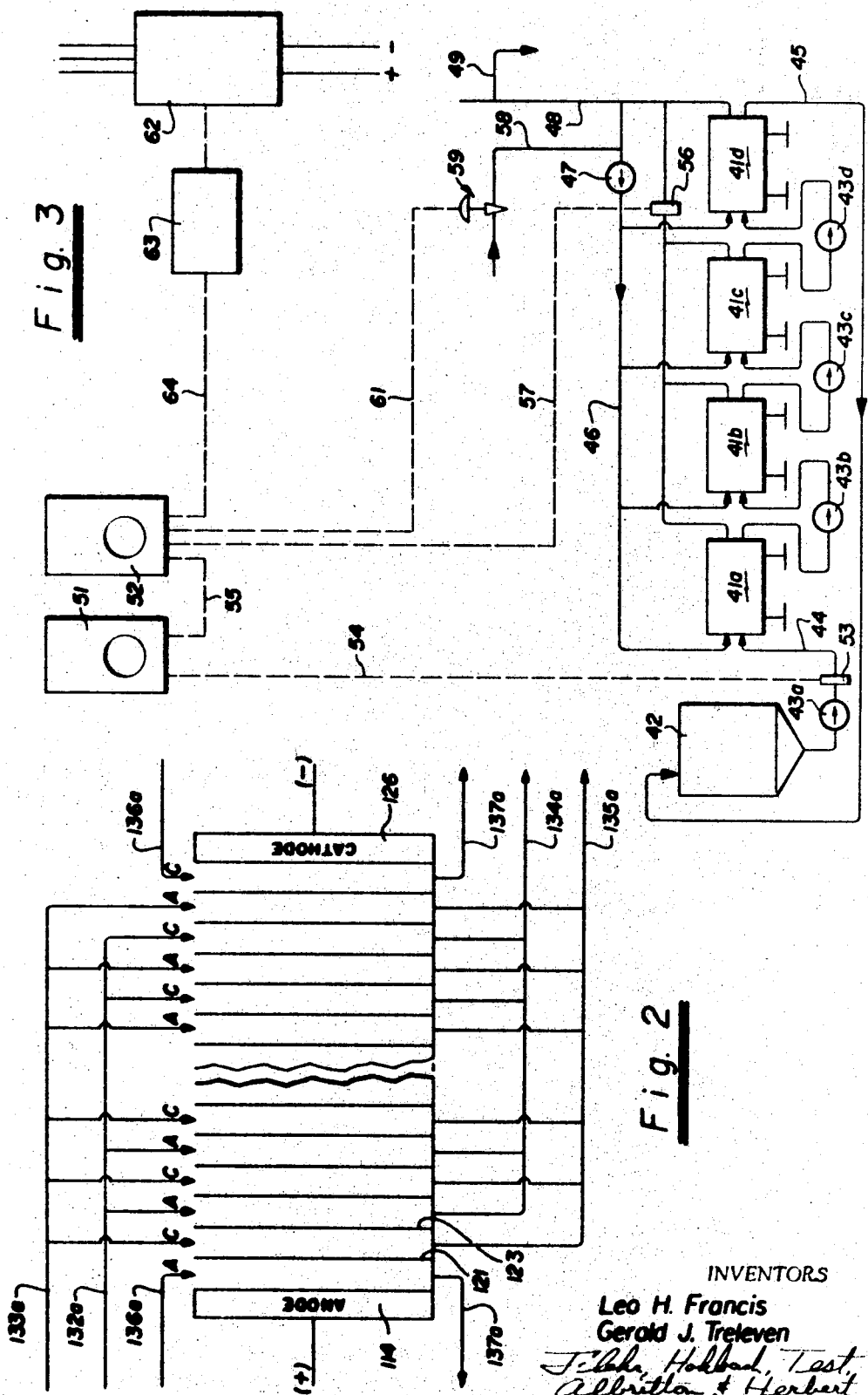

3,544,436
ELECTRODIALYSIS PROCESS AND APPARATUS

Leo H. Francis, Burlingame, Calif., and Gerald J. Treleven, Appleton, Wis., assignors to Foremost-McKesson, Inc., San Francisco, Calif., a corporation of Maryland
Continuation-in-part of application Ser. No. 404,658, Oct. 19, 1964. This application Mar. 27, 1969, Ser. No. 811,187
Int. Cl. B01b 13/02
U.S. Cl. 204—180     3 Claims

ABSTRACT OF THE DISCLOSURE

Electrodialysis method and apparatus for reducing the mineral salt content of liquid materials having dispersed organic constituents (e.g., whey). Certain factors are controlled during the course of an operating cycle, including the applied stack voltage and the resistivity of the concentrating solution, together with the selection of membranes to provide low working membrane resistance, whereby demineralization of such materials is made more efficient, with savings in processing costs.

CROSS-REFERENCE TO RELATED APPLICATIONS

This application is a continuation-in-part of our copending application Ser. No. 404,658, filed Oct. 19, 1964, for "Electrodialysis Process and Apparatus," now abandoned.

BACKGROUND OF THE INVENTION

It is well known that various liquid materials having organic constituents, such as whey produced in the manufacture of cheese, can be processed by reducing its mineral salt content to provide a food product suitable for animal or human consumption. Several processes can be employed for this purpose, including dialysis, contact with ion exchange resins, and electrodialysis. Electrodialysis offers theoretical commercial advantages. Commercial electrodialysis equipment now available consists of stacks formed by assembling pairs of ion exchange membranes (anionic and cationic) with intervening gridlike spacers or separators which provide extended channels for flow of the liquid product and the concentrating or brine solution. At the ends of the stack electrodes are provided for applying an appropriate voltage. Several of such stacks or stack pairs may be connected in series, and the batch material being treated may be recirculated many times to attain a desired residual salt content. When a plurality of such stacks are connected in series and employed to desalt whey, the overall electrical resistance of each stack increases at a rapid rate during an operating cycle. This increase is partially offset by increasing the applied voltage during the cycle. Even with such control, it is recognized that the increase in stack resistance over an operating cycle serves to materially impair operating efficiency and thus increases the cost of processing.

A substantial factor in stack resistance is the resistance of each membrane pair. During a batch treatment cycle the membrane pair resistance is subject to a substantial increase, and this plays an important part in the increase in stack resistance and in limiting the overall performance of the equipment. Also there is a continual increase in the rate with which the membranes increase in resistance. The reasons for this increase in membrane resistance are not clearly understood but may be due to one or more of several causes, such as chemical complexing of the exchange sites within either or both the anionic or cationic membrane, or complex polarization phenomena.

The resistance of a cell pair consisting of homogeneous anion and cation membranes can be substantially reduced by the selection of proper membrane porosities. More specifically, when the porosities of the anion and cation membranes differ by about 4% or more, the membrane resistance of the cell pair is substantially less than when the membranes are of substantially the same porosity. However, without the use of proper control factors such as form the subject of this invention, the use of membranes differing substantially as to porosity will not produce the increase in efficiency and effective capacity comparable to that obtained by the present invention. Thus prior practice has not recognized the importance of proper control factors together with the selection of membranes differing substantially in porosity.

SUMMARY OF THE INVENTION AND OBJECTS

This invention relates generally to process and apparatus for the removal of mineral salts from aqueous materials by electrodialysis.

In general it is an object of the invention to provide a process and apparatus of the above character which will provide high operating efficiency with substantial savings in processing costs.

Another object of the invention is to provide a process and apparatus of the above character in which the necessary control values lend themselves to automation, and in which the factors of applied stack voltage and the resistivity of the concentrating brine are controlled in such a manner as to provide greatly increased efficiency over an operating cycle.

Additional objects and features of the invention will appear from the following description in which the preferred embodiment has been set forth in detail in conjunction with the accompanying drawing.

BRIEF DESCRIPTION OF THE DRAWING

FIG. 2 is a schematic drawing illustrating a stack like FIG. 1.

FIG. 3 is a schematic diagram illustrating a plurality of stacks in one system.

FIG. 1 is an exploded view illustrating schematically a stack comprising a plurality of cells, each cell including an anion and a cation membrane. Briefly, the stack assembly includes the end structure 10 which is in the form of a rigid reinforced plate. Assembled on the lower side of this plate there is a suitable gasket 11 and a top end block 12 that serves as electrical insulation. Below the block 12 there is another gasket 13, and below this the anode plate 14. The anode 14 is connected to the current supply conductor 16. Below the anode 14 there is an electrode rinse cell and a neutral cell 17a, comprising the separating grid 18, the relatively heavy anion membrane 19, and the separating grid 20. The grids 18 and 20 are formed of suitable material (e.g. polyethylene) to provide extended circuitous flow paths or channels. The channels in grid 18 serve to conduct the rinsing stream and the channels on grid 20 conduct the brine or concentrating stream, the later grid functioning as a neutral cell.

Figure 1:
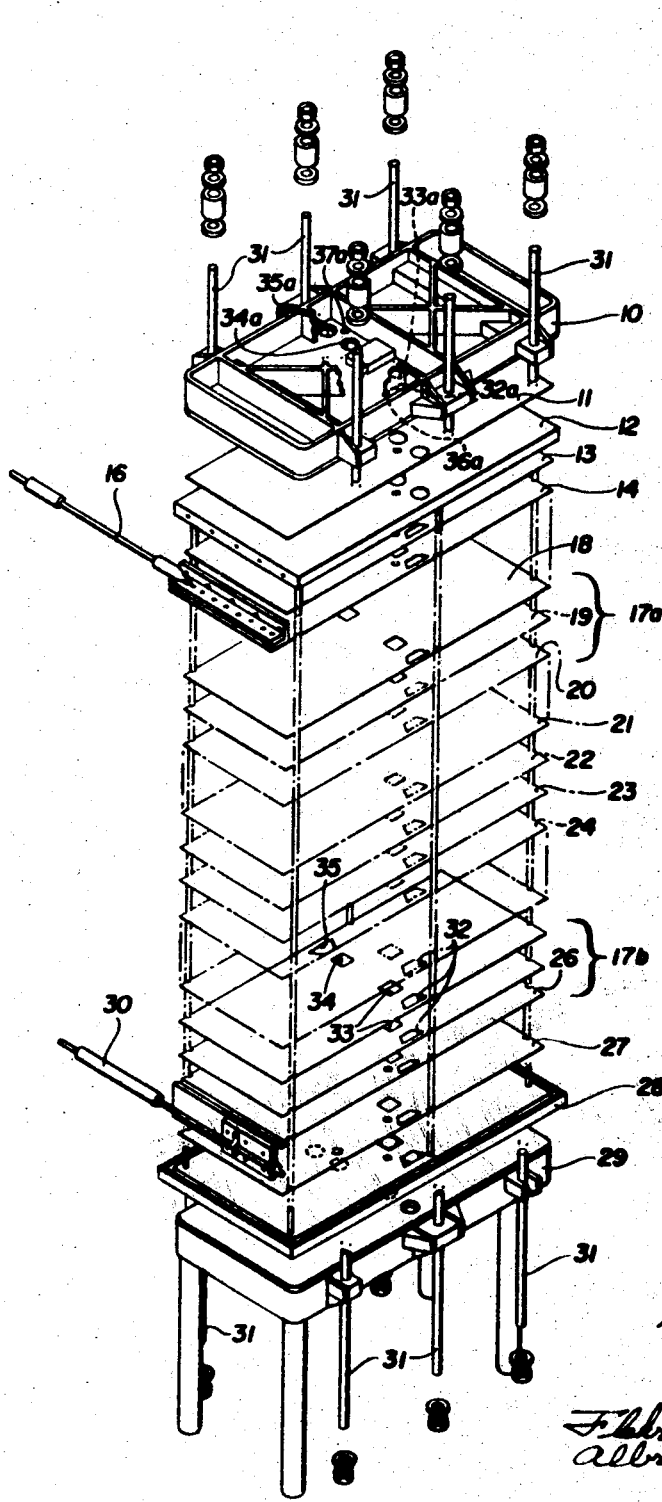
FIG. 1 is an exploded view illustrating schematically an electrodialysis stack comprising a plurality of cells.

Below the neutral cell, a plurality of cells is formed by the anion membranes 21 and cation membranes 23. These membranes are separated by the spacer or separator grids 22 and 24. The cells thus formed are repeated whereby in a typical stack one hundred complete cells may be provided. Below these cells there is another neutral cell and an electrode rinse cell 17b. At the bottom of the stack assembly, the cathode plate 26, cathode gasket 27, and bottom end block 28 are assembled upon the bottom end plate 29. Plate 26 is connected to the conductor 30.

All of the elements of the stack are assembled one upon the other, after which the end plates are clamped together by the rods 31. A plurality of ports are provided through the assembled parts to provide passages making fluid connection with the extended flow paths provided by the separator grids. Thus all of the assembled members are provided with ports 32, 33, 34 and 35, which in the completed assembly form flow passages. The top and bottom end plates are provided with aligned matching ports 32a, 33a, 34a and 35a. Piping connected to either the top or bottom ones of these ports (or both) serves to supply and remove the brine or concentrating solution and the product being treated. For example, brine can be supplied to the top or bottom end port 32a and removed from the stacks through the top or bottom end port 34a. Whey can be supplied to the top or bottom end port 33a and removed through the top or bottom end port 35a. Thus brine solution is caused to flow through the extended channels or paths formed by the spacing grids 24, and whey is caused to flow through the extended channels of spacing grids 22. Thus for each effective working cell of the stack, a flowing stream of whey is interposed between adjacent anion and cation membranes, and the exterior faces of these membranes are in contact with flowing concentrating solution flowing through the channels of the adjacent separator grids 24. With respect to liquid flow paths the working cells are connected in parallel. Electrically they are connected in series.

The members 11–14 are also provided with the ports 36a and 37b which communicate with the ports 36a and 37a in the end plate 10. Piping connected to these ports provides an electrode stream which flows through the channels of the separator grid 18. The same is true for the lower end of the assembly.

FIG. 2 schematically illustrates the stack of FIG. 1, with associated piping. For simplicity the spacers and the neutral cells at each end of the assembly have been omitted. The members employed are the same as in FIG. 1, except that the prefix 1 has been added. Members 114 and 126 represent the anode and cathode electrodes 14 and 26 of FIG. 1. 121 and 123 represent the membranes 21 and 23, 121 being an anion membrane and 123 a cation membrane. Line 132a represents the flow of concentrating solution to all of the cells. This may also be termed the waste stream or concentrating stream. Line 134a represents the removal of the brine or waste stream from the cells of the stack. Line 133a represents the flow of whey to the cells of the stack. Line 135a represents the removal of whey from the stack. Additional lines 136a and 137a represent the introduction and removal of the liquid electrode stream to the anode and cathode assemblies.

In the normal use of such a stack, and referring particularly to FIG. 2, the whey or other liquid material to be desalted is supplied to the separator grids of the various cells, and after flowing through the extended paths provided by the separator channels, it is discharged through line 135a. The solution in which the salt is being concentrated is simultaneously continuously being delivered to the various cells, as indicated by line 132a, and is caused to flow through the extended channels provided by certain of the separators, after which this solution is discharged as indicated by line 134a. A suitable electrolyte solution or electrode stream, such as a solution of sulfuric or hydrochloric acid, is continuously supplied to the assemblies adjacent the anode and cathode, as indicated by the lines 136a and 137a. In general the anion and cation transfer membranes are separated by a spacer carrying the liquid product to be desalted, whereby this product is brought into ion transfer relationship with the membranes of the pair. The exterior sides of the membrane pair are in contact with the waste stream or concentrating solution being carried by the adjacent separators. By transfer of anion and cation ions, metals or salts are removed from the liquid product and concentrated in the waste stream.

The voltages applied to the anode and cathode are such as to provide a maximum rate of transfer, or in other words, a maximum desalting rate, without occasioning any injury to the elements of the stack, or to the liquid product being treated. As employed in the past, the voltage applied to the stack may remain constant for a batch cycle, or it may be programmed, or in other words, gradually increased during a batch cycle as the over all electrical resistance of the stack increases.

In the commercial installations of electrodialysis equipment as described above, it is customary to use a plurality of stacks connected in series. Also it is common to recirculate the liquid material through the stacks a number of times to reach a desired residual salt level. It has been observed that the detrimental effects resulting from an increase in stack resistance are aggravated when several stacks are operated in series with a single control system.

As previously stated, stacks of the type shown in FIG. 1 are available on the market, and construction of such stacks is known to those skilled in the field of electrodialysis. Representative homogeneous membranes and methods for their manufacture are disclosed in Clark, 2,730,768; 2,731,411; and 2,800,445. In general, such homogeneous ion exchange membranes are thin sheets of either anion or cation exchange resins supported by an inert material. The anion membranes may be a quaternized copolymer of a polyvinyl aromatic and a monovinyl aromatic. The copolymers are initially haloalkylated and then quaternized with a strong base amine (e.g., diethyl triamine). The cation membranes may be a sulfonated copolymer of a polyvinyl aromatic (e.g., divinyl benzene) and a monovinyl aromatic (e.g., vinyl benzene). The separators or grids may be made of a suitable plastic material, such as polyethylene.

To provide stack cells of relatively low working membrane resistance, we employ in the stack homogeneous anion membranes of relatively low porosity in conjunction with homogeneous cation membranes of relatively higher porosity. The sizes of the pores in the membranes is in the low angstrom range, as for example from 8 to 12 angstroms. Porosity is directly correlated to moisture holding capacity. Moisture holding capacity can be readily determined by standard laboratory procedures such as the following. A piece of the membrane 1" square and which is in moist condition is placed in water at 20° C. for a period of 24 hours. The sample is then removed from the water, blotted dry, and weighed. Thereafter it is dried in an oven at 100° C. to constant weight. The moisture content is determined by the difference between the weight and dry weights. Membranes commonly include a synthetic fiber cloth backing. The percentage by weight of the backing material and its moisture holding capacity are known. The weight of the resin is determined by subtracting the weight of the backing from the dry weight of the test section of the membrane sample subjected to analysis. Likewise the amount which the backing, by itself, will hold, is known and corrected for. After correcting for the moisture in the backing, the moisture holding capacity of the membrane is calculated as follows:

$$\frac{\text{Weight of moisture of wet resin}}{\text{Weight of wet resin}} \times 100 = \text{percent moisture in resin}$$

The moisture holding capacity of membranes (i.e., of the resins of the membranes) of the class suitable for use in our invention may range from about 35 to 60%. The so-called tighter membranes which have lower porosity may range from about 39 to 42%, and the looser membranes having greater porosity may range from about 44 to 47%. We have obtained good results by using anion membranes having moisture holding capacities ranging from about 40 to 42% and cation membranes having moisture capacities ranging from about 44 to 46%. Available commercial membranes having moisture holding capacities of this order are anion membranes known by manufacturer's specifications as Form I Code No. 111-EZL-4-219, and cation membranes known by manufacturer's specifications as Regular or Standard Code No. 61-AZL-4-219, and Regular or Standard Code No. 61-AZL-4-183 (Ionics, Inc., Cambridge, Mass.).

Also in general we prefer that the resins of the anion and cation membranes differ in moisture carrying capacity by about 4% or more.

A complete system including a plurality of electrodialysis stacks connected in series is shown schematically in FIG. 3. Blocks 41a–41d represent the four stacks of the line. Tank 42 serves to contain a batch of liquid material (e.g., whey) to be treated. Whey from this tank is delivered by pump 43a and line 44 to the stack 41a, and the whey discharging from this and subsequent stacks is delivered to the succeeding stacks by way of pumps 43b, 43c and 43d. Whey leaving stack 41d is shown returning to the tank 42 by line 45. The brine or concentrating solution is continuously circulated through the several stacks by the recirculating loop 46 together with the pump 47. The inlet side of pump 47 connects with a stand pipe 48 which in turn connects with overflow spill pipe 49.

Two resistivity recorder-controllers 51 and 52 are provided. The recorder-controller 51 measures and records whey stream resistivity and programs the control activity of the brine stream resistivity recorder-controller (52). The brine resistivity controller 52 measures brine resistivity and controls it in fixed relation to whey resistivity as programmed by the whey resistivity recorder 51. The recorder-controllers 51 and 52 have an interconnecting line 55 which may be either pneumatic or electrical. The discharge from the pump 43a passes through a resistivity response device 53 which has an electrical connection 54 to the recorder-controller 51, whereby a signal input from device 53 activates the recorder-controller 51. The return brine line to pump 47 passes through a resistivity responsive device 56 which has an electrical connection 57 to the recorder-controller 52. A fresh water make up line 58 connects with the inlet side of pump 47 and is provided with the air operated flow control valve 59. This valve has a controlling connection 61 with recorder-controller 52. The D-C current supply to each of the stacks is shown provided by the rectifier 62 which is supplied with three-phase alternating current. The rectifier is such that its output voltage can be regulated by a control voltage applied by the voltage control device 63. This device in turn has an electrical controlling connection 64 from the recorder-controller 52.

Operation of the system shown in FIG. 3 is as follows: The stack line is put in operation with voltage being applied to each of the stacks and with the whey flowing serially through the stacks and recirculated back to the tank 42. Brine is continuously recirculated through the entire batch cycle. The resistivity of the whey is visually indicated by the recorder-controller 51. Likewise resistivity of the recirculated concentrating solution or brine is visually indicated by the recorder-controller 52. In the initial part of the cycle the resistivity of the brine or concentrating solution falls rapidly until it is substantially of the same value as that of the whey. Thereafter the resistivity of the whey gradually increases until the end of the cycle. Approximately when the resistivity of the whey reaches a value substantially the same as that of the concentrating solution, the recorder-controllers 51 and 52 supply impulse to the flow control valve 59 whereby this valve opens a controlled amount to introduce a controlled amount of make up water into the solution line 46. In this manner brine stream resistivity is controlled in a fixed and predetermined relationship to whey stream resistivity. Introduction of make up water is accompanied by discharge of solution through the overflow pipe 49. The recorder-controllers 51 and 52 likewise supply a controlling signal to the voltage control device 63 whereby this device in turn controls the rectifier to adjust the voltage to an optimum and predetermined value. The applied voltage is gradually increased throughout the batch cycle, the value at any one time being such as to obtain maximum performance without endangering the stacks. Control 63 is under the control of both recorder-controllers 51 and 52, and it serves to adjust the voltage in accordance with resistivity of brine which has, by the means above described, a controlled resistivity lower than the whey and a controlled relationship to that of the whey.

By way of example, tests have been carried out on electrodialysis equipment similar to that shown in FIG. 3 and comprising 4 stacks operating in series, each stack including 101 anion and 100 cation membranes plus 2 electrode anion membranes. The cheese whey employed in these tests was introduced at pH 6.3 with an ash content of 8.9%. One four-stack line was equipped completely with membranes (hereinafter referred to as type A) having a moisture holding capacity of 40.7% as determined by testing a representative membrane. A second four-stack line was equipped completely with membranes (hereinafter referred to as type B) having a moisture holding capacity of 44.66% as determined by testing a representative membrane. A third four-stack line was equipped completely with type A anion membranes and type B cation membranes, thus providing cells having membranes differing to a marked and determined degree as to porosity. Data from the operation of the three assemblies was compiled in two groups. The Group I data represents average data for the three lines from three representative production days over a twenty-day period of daily operation. Group II data represents single run data from each of the three lines made on the same day under carefully controlled conditions, and on a common raw material.

The results of Group I data is shown in the following Table No. I.

TABLE NO. I.—GROUP I DATA

[Average runs from three days operation]

| Type membrane | Starting solids, lbs. | Ending solids, lbs. | Run time [1] | Percent yield | Process rate [2] | Percent final calcium [3] | Percent final ash |
|---|---|---|---|---|---|---|---|
| A | 3,467 | 2,690 | 5.03 | 77.59 | 5.54 | 0.166 | 0.811 |
| A&B | 3,552 | 2,787 | 4.24 | 78.46 | 6.86 | 0.165 | 0.898 |
| B | 3,620 | 2,542 | 5.54 | 70.22 | 5.28 | 0.159 | 0.816 |

[1] Run time in hours.
[2] Process rate in terms of lbs. starting solids per hour per sq. meter of membrane area.
[3] Runs terminated on basis of final calcium level.

As previously stated, the above table provides average data for each of the three stack lines described above. In general the Group I Table I data shows the decreased batch time for the mixed membrane (A & B) line, together with an increased process rate, since batch size, yield, terminal calcium and terminal ash were essentially the same. Under the same conditions of voltage programming, the line using membranes differing in porosity (types A and B) showed an average increase in process rate of 23.8% over the line using all type A membranes, and 29.9% increase in process rate over the line using the type B membranes.

The data for the Group II runs is shown in the following Table No. II.

TABLE NO. II.—GROUP II DATA
[Single runs]

| | Run time [1] | Percent yield | Process rate [2] | Percent final calcium [3] |
|---|---|---|---|---|
| Type membrane: | | | | |
| A | 5.27 | 77.9 | 5.01 | 0.168 |
| A&B | 4.27 | 83.8 | 6.98 | 0.163 |
| B | 5.36 | 70.0 | 5.33 | 0.165 |

[1] Run time in hours.
[2] Process rate in terms of lbs. starting solids per hour per sq. meter of membrane area.
[3] Runs terminated on basis of final calcium level.

The above Table II represents single run data for each of the three lines, on the same starting material. It shows that the line containing type A and type B membranes, differing as to porosity, obtained a 39.3% increase in process rate over the line using type A membranes alone, and a 30.9% increase over the line using type B membranes alone.

The following Tables II, IV and V show the control factors, namely the voltage, amperage and resistance data for each of the three stack lines referred to above in connection with Table No. II.

TABLE NO. III.—GROUP II DATA
[Single run, type A membranes]

| Time | E | $I_1$ | $I_2$ | $I_3$ | $I_4$ | $R_1$ | $R_2$ | $R_3$ | $R_4$ | $I_t$ | $R_{st}$ | $R_p$ | $R_{sw}$ | $R_{sb}$ | $R_m$ | $R_f$ | $R_m/R_p$ |
|---|---|---|---|---|---|---|---|---|---|---|---|---|---|---|---|---|---|
| 2 | 200 | 82 | 77 | 74 | 68 | 2.44 | 2.60 | 2.70 | 2.94 | 301 | 2.67 | 8.28 | 62 | 85 | 68.1 | 14.7 | 0.825 |
| 4 | 200 | 88 | 84 | 80 | 74 | 2.28 | 2.38 | 2.50 | 2.70 | 326 | 2.47 | 76.5 | 68 | 62 | 63.5 | 13.0 | 0.830 |
| 6 | 200 | 94 | 90 | 86 | 77 | 2.13 | 2.22 | 2.33 | 2.60 | 347 | 2.32 | 72.0 | 71 | 47 | 60.2 | 11.8 | 0.836 |
| 8 | 200 | 98 | 94 | 90 | 80 | 2.04 | 2.13 | 2.22 | 2.50 | 362 | 2.22 | 68.9 | 73 | 40 | 57.6 | 11.3 | 0.837 |
| 10 | 212 | 86 | 80 | 75 | 66 | 2.46 | 2.65 | 2.82 | 3.21 | 207 | 2.79 | 86.4 | 75 | 47 | 74.2 | 13.2 | 0.860 |
| 12 | 227 | 90 | 84 | 78 | 70 | 2.52 | 2.70 | 2.91 | 3.24 | 322 | 2.84 | 88.0 | 78 | 53 | 74.9 | 13.1 | 0.851 |
| 17 | 230 | 88 | 84 | 78 | 70 | 2.62 | 2.74 | 2.95 | 3.29 | 320 | 2.90 | 90.0 | 81 | 53 | 76.6 | 13.4 | 0.851 |
| 22 | 235 | 84 | 81 | 76 | 67 | 2.80 | 2.90 | 3.10 | 3.51 | 208 | 3.08 | 95.5 | 89 | 56 | 81.0 | 14.5 | 0.849 |
| 27 | 247 | 83 | 79 | 72 | 64 | 2.97 | 3.12 | 3.43 | 3.86 | 298 | 3.35 | 103.8 | 91 | 59 | 88.8 | 15.0 | 0.856 |
| 44 | 252 | 69 | 68 | 62 | 54 | 3.65 | 3.70 | 4.06 | 4.67 | 253 | 4.02 | 124.5 | 117 | 63 | 106.5 | 18.0 | 0.855 |
| 74 | 297 | 56 | 54 | 49 | 43 | 5.30 | 5.50 | 6.06 | 6.90 | 202 | 5.94 | 184.0 | 176 | 80 | 158.4 | 25.6 | 0.861 |
| 104 | 385 | 48 | 48 | 45 | 40 | 8.02 | 8.02 | 8.55 | 9.62 | 181 | 8.55 | 265.0 | 330 | 117 | 220.3 | 44.7 | 0.832 |
| 134 | 428 | 36 | 38 | 36 | 31 | 11.9 | 11.27 | 11.90 | 13.8 | 141 | 12.22 | 379.0 | 480 | 190 | 312.0 | 67.0 | 0.823 |
| 164 | 428 | 26 | 26 | 25 | 22 | 16.45 | 16.45 | 17.10 | 19.45 | 99 | 17.36 | 538.0 | 735 | 280 | 436.5 | 101.5 | 0.811 |
| 194 | 430 | 20 | 19 | 17 | | 21.5 | 22.6 | 22.6 | 25.3 | 75 | 23.0 | 714.0 | 1,020 | 308 | 581.2 | 132.8 | 0.815 |
| 224 | 434 | 16 | 15 | 15 | 14 | 27.1 | 28.9 | 28.9 | 31.0 | 60 | 29.0 | 900.0 | 1,317 | 306 | 737.7 | 162.3 | 0.819 |
| 254 | 438 | 13 | 13 | 12 | 12 | 33.7 | 33.7 | 36.5 | 36.5 | 50 | 35.1 | 1,088.0 | 1,570 | 308 | 900.2 | 187.8 | 0.827 |
| 284 | 440 | 12 | 12 | 10 | 11 | 36.7 | 36.7 | 44.0 | 40.0 | 45 | 39.35 | 1,220.0 | 1,845 | 305 | 1,005.0 | 215.0 | 0.825 |
| 314 | | | | | | | | | | | | | | | | | |

TABLE NO. IV.—GROUP II DATA
[Single run-type A&B membranes]

| Time | E | $I_1$ | $I_2$ | $I_3$ | $I_4$ | $R_1$ | $R_2$ | $R_3$ | $R_4$ | $I_t$ | $R_{st}$ | $R_p$ | $R_{sw}$ | $R_{sb}$ | $R_m$ | $R_f$ | $R_m/R_p$ |
|---|---|---|---|---|---|---|---|---|---|---|---|---|---|---|---|---|---|
| 3 | 200 | 60 | 60 | 56 | 60 | 3.33 | 3.33 | 3.57 | 3.33 | 236 | 3.39 | 105.1 | (70) | 190 | 79.1 | 26.0 | 0.752 |
| 5 | 200 | 100 | 98 | 92 | 92 | 2.0 | 2.04 | 2.17 | 2.17 | 382 | 2.10 | 65.0 | 71 | 55 | 52.4 | 12.6 | 0.805 |
| 7 | 175 | 100 | 96 | 90 | 86 | 1.75 | 1.82 | 1.95 | 2.04 | 372 | 1.89 | 58.6 | 75 | 35 | 47.6 | 11.0 | 0.812 |
| 9 | 170 | 100 | 94 | 88 | 84 | 1.70 | 1.81 | 1.93 | 2.02 | 366 | 1.87 | 57.8 | 78 | 30 | 47.0 | 10.8 | 0.813 |
| 11 | 210 | 100 | 90 | 82 | 76 | 2.10 | 2.34 | 2.56 | 2.76 | 348 | 2.44 | 75.6 | 80 | 45 | 63.1 | 12.5 | 0.834 |
| 13 | 215 | 100 | 94 | 84 | 80 | 2.15 | 2.29 | 2.56 | 2.69 | 358 | 2.42 | 75.0 | 85 | 50 | 61.5 | 13.5 | 0.820 |
| 18 | 240 | 100 | 92 | 84 | 78 | 2.40 | 2.61 | 2.86 | 3.08 | 354 | 2.74 | 85.0 | 90 | 60 | 70.0 | 15.0 | 0.823 |
| 23 | 252 | 100 | 91 | 81 | 76 | 2.52 | 2.77 | 3.11 | 3.32 | 348 | 2.93 | 90.9 | 95 | 62 | 75.2 | 15.7 | 0.828 |
| 38 | 270 | 92 | 82 | 73 | 67 | 2.93 | 3.29 | 3.70 | 4.03 | 314 | 3.49 | 108.2 | 120 | 67 | 89.5 | 18.7 | 0.826 |
| 53 | 297 | 85 | 75 | 66 | 60 | 3.50 | 3.96 | 4.50 | 4.95 | 286 | 4.23 | 131.1 | 145 | 77 | 108.9 | 22.2 | 0.830 |
| 83 | 348 | 78 | 61 | 55 | 50 | 4.46 | 5.70 | 6.32 | 6.96 | 244 | 5.86 | 181.9 | 227 | 98 | 149.4 | 32.5 | 0.823 |
| 113 | 428 | 59 | 51 | 49 | 46 | 7.25 | 8.40 | 8.74 | 9.30 | 205 | 8.42 | 261.0 | 357 | 148 | 210.5 | 50.5 | 0.806 |
| 143 | 435 | 44 | 38 | 37 | 35 | 9.89 | 11.43 | 11.75 | 12.42 | 154 | 11.37 | 352.5 | 540 | 188 | 279.7 | 72.8 | 0.793 |
| 173 | 440 | 34 | 29 | 28 | 27 | 12.95 | 15.15 | 15.70 | 16.30 | 118 | 15.03 | 466.0 | 772 | 242 | 364.6 | 101.4 | 0.782 |
| 203 | 440 | 27 | 23 | 23 | 23 | 16.3 | 19.1 | 19.1 | 19.1 | 96 | 18.4 | 570.0 | 1,005 | 272 | 442.3 | 127.7 | 0.776 |
| 233 | 440 | 22 | 19 | 19 | 20 | 20.0 | 23.1 | 23.1 | 22.0 | 80 | 22.05 | 684.0 | 1,307 | 308 | 522.5 | 161.5 | 0.765 |
| 255 | 440 | | | | | | | | | | | | | | | | |

TABLE NO. V.—GROUP II DATA
[Single run, type B membranes]

| Time | E | $I_1$ | $I_2$ | $I_3$ | $I_4$ | $R_1$ | $R_2$ | $R_3$ | $R_4$ | $I_t$ | $R_{st}$ | $R_p$ | $R_{sw}$ | $R_{sb}$ | $R_m$ | $R_f$ | $R_m/R_p$ |
|---|---|---|---|---|---|---|---|---|---|---|---|---|---|---|---|---|---|
| 2 | 200 | 86 | 85 | 78 | 77 | 2.33 | 2.35 | 2.56 | 2.60 | 326 | 2.46 | 76.26 | 62 | 140 | 56.0 | 20.2 | 0.735 |
| 4 | 195 | 100 | 96 | 90 | 83 | 1.95 | 2.03 | 2.17 | 2.35 | 369 | 2.13 | 63.90 | 66 | 63 | 51.0 | 12.9 | 0.798 |
| 6 | 181 | 100 | 93 | 87 | 78 | 1.81 | 1.95 | 2.08 | 2.32 | 358 | 2.04 | 63.24 | 68 | 43 | 52.1 | 11.1 | 0.825 |
| 8 | 200 | 100 | 90 | 84 | 74 | 2.00 | 2.22 | 2.38 | 2.70 | 348 | 2.33 | 72.33 | 72 | 45 | 60.5 | 11.7 | 0.838 |
| 10 | 210 | 100 | 88 | 80 | 71 | 2.10 | 2.39 | 2.63 | 2.96 | 339 | 2.52 | 78.12 | 76 | 50 | 65.5 | 12.6 | 0.838 |
| 12 | 215 | 100 | 88 | 80 | 70 | 2.15 | 2.44 | 2.69 | 3.07 | 338 | 2.59 | 80.29 | 77 | 50 | 67.6 | 12.7 | 0.841 |
| 17 | 225 | 100 | 90 | 83 | 72 | 2.25 | 2.50 | 2.71 | 3.13 | 345 | 2.65 | 82.15 | 81 | 55 | 68.55 | 13.6 | 0.835 |
| 22 | 236 | 99 | 88 | 80 | 70 | 2.38 | 2.68 | 2.95 | 3.37 | 337 | 2.85 | 88.35 | 85 | 54 | 74.45 | 13.9 | 0.842 |
| 37 | 247 | 86 | 74 | 67 | 59 | 2.87 | 3.34 | 3.69 | 4.19 | 286 | 3.52 | 109.12 | 99 | 58 | 93.4 | 15.7 | 0.855 |
| 52 | 260 | 79 | 68 | 60 | 54 | 3.29 | 3.82 | 4.33 | 4.81 | 261 | 4.06 | 125.86 | 117 | 63 | 107.9 | 18.0 | 0.858 |
| 82 | 294 | 64 | 54 | 49 | 46 | 4.59 | 5.44 | 6.00 | 6.39 | 213 | 5.61 | 173.91 | 160 | 77 | 150.2 | 23.7 | 0.865 |
| 112 | 340 | 54 | 47 | 44 | 41 | 6.30 | 7.23 | 7.73 | 8.29 | 186 | 7.39 | 229.09 | 226 | 96 | 196.9 | 32.2 | 0.860 |
| 142 | 425 | 50 | 44 | 41 | 38 | 8.50 | 9.66 | 10.37 | 11.18 | 173 | 9.93 | 307.83 | 346 | 137 | 259.5 | 48.3 | 0.844 |
| 172 | 430 | 39 | 33 | 31 | 29 | 11.03 | 13.03 | 13.87 | 14.83 | 132 | 13.19 | 408.89 | 517 | 192 | 338.0 | 70.9 | 0.829 |
| 202 | 438 | 30 | 26 | 23 | 22 | 14.60 | 16.85 | 19.04 | 19.91 | 101 | 1.760 | 545.60 | 708 | 255 | 449.3 | 96.3 | 0.824 |
| 232 | 435 | 24 | 20 | 18 | 17 | 18.12 | 21.75 | 24.17 | 25.59 | 79 | 22.41 | 694.71 | 903 | 297 | 574.7 | 120.0 | 0.827 |
| 262 | 440 | 20 | 17 | 15 | 15 | 22.00 | 25.88 | 29.33 | 29.33 | 67 | 26.64 | 825.84 | 1,110 | 292 | 685.6 | 140.2 | 0.830 |
| 292 | 435 | 18 | 15 | 13 | 12 | 24.17 | 29.00 | 33.46 | 36.25 | 58 | 30.72 | 952.32 | 1,300 | 287 | 793.6 | 158.7 | 0.834 |
| 322 | | | | | | | | | | | | | | | | | |

Figure 4:
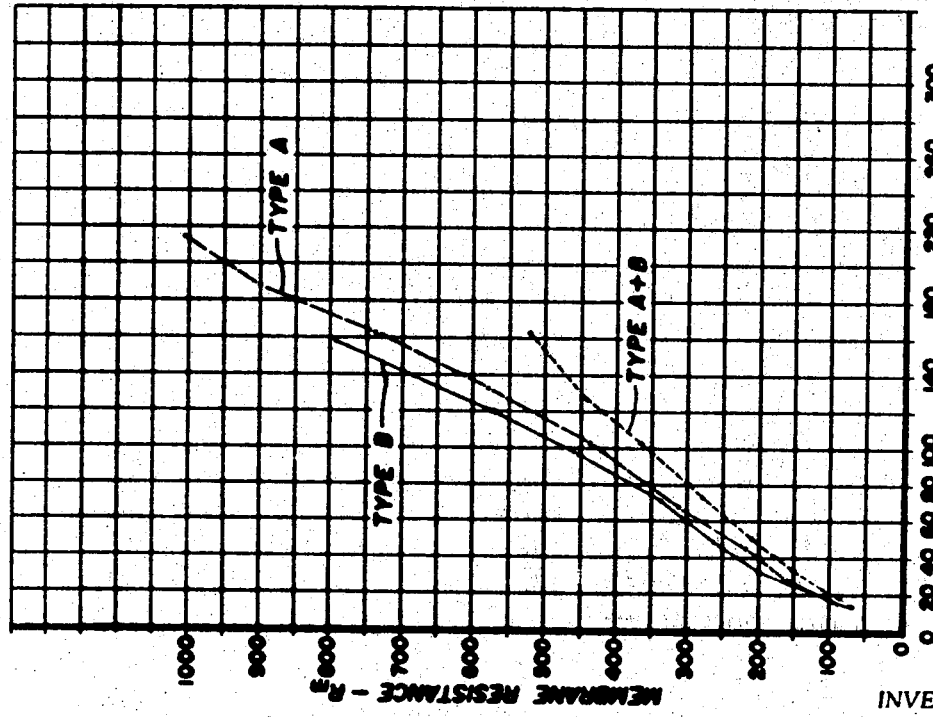

The symbols used in the foregoing tables are as follows:

T—Time, minutes
E—Applied stack voltage
$I_1$—Stack current, amps, Stack No. 1
$I_t$—Total current, amps, 4 stacks
$R_1$—Stack resistance, ohms, Stack No. 1
$R_{sb}$—Brine stream resistivity, ohms-cms.
$R_{sw}$—Mean whey stream resistivity, ohm-cms.
$R_m$—Membrane resistance, ohms/sq. cm./cell pair
$R_f$—Fluid stream resistance, ohms/sq. cm./cell pair
$R_p$—Cell pair resistance, ohms/sq. cm./cell pair
$R_{st}$—Average resistance of 4 stacks, ohms FIG. 4 is a graph showing the relationship between membrane resistance ($R_m$) and fluid stream resistance ($R_f$) for the three different membrane combinations referred to above, as determined from Group II data. It is observed from this plot that with the mixed membrane combination, membrane resistance and also the rate of increase in membrane resistance are always lower for a given fluid stream resistance than with either the paired type A or the type B membranes.

Figure 5:
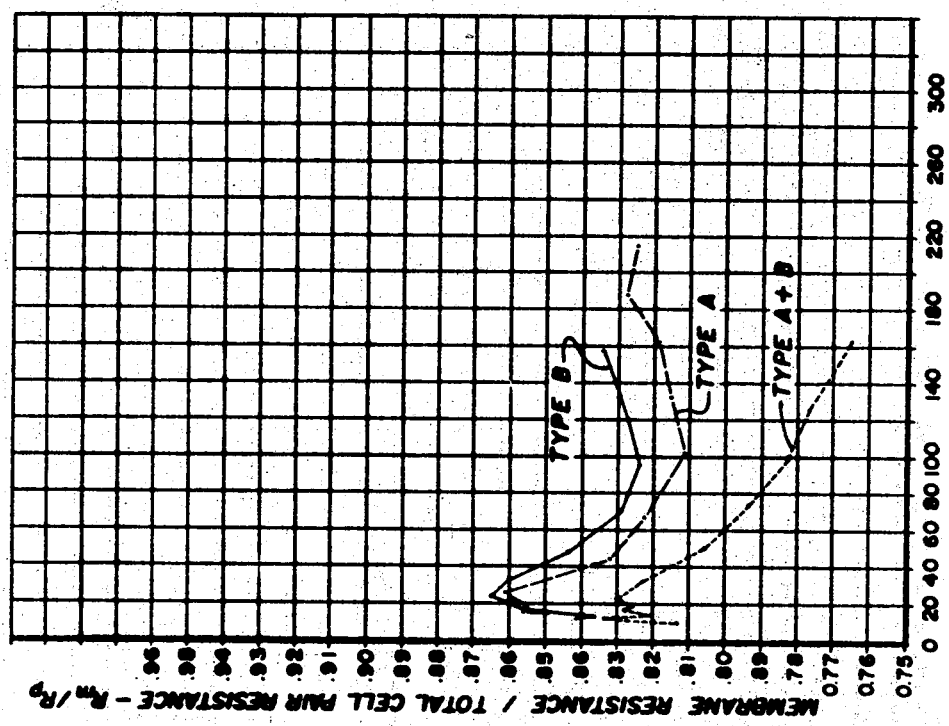
FIGS. 4, 5 and 6 are curves plotted to illustrate certain characteristics of our invention.

FIG. 5 is a graph showing, for each of the three membrane combinations, the magnitude of membrane resistance in relation to the total "cell pair" resistance as the fluid stream resistance increases during the course of the electrodialysis run. When type A anion and type B cation membranes are combined, the ratio $R_m:R_p$ is found to be significantly less than the same ratio found to exist when all type B or all type A membranes are employed in the process.

Figure 6:
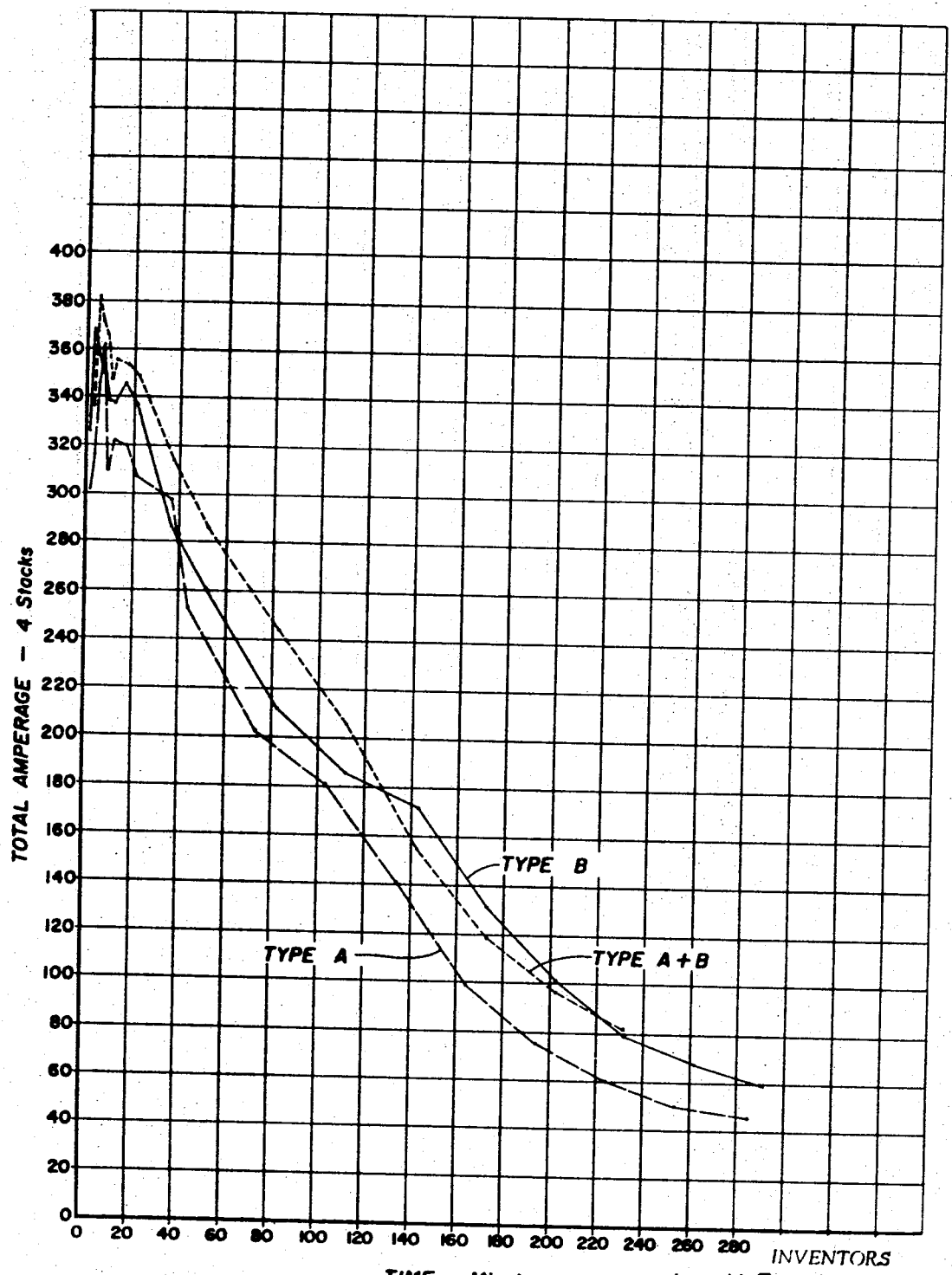

FIG. 6 is a graph plotted from the data in Tables III–V showing stack amperage plotted against time and indicates for the different membrane combinations the effectiveness of the reduced membrane resistance in providing lower stack resistance, high amperage and more rapid accumulation of ampere-minutes in the portion of the run when it can be most effective.

As will be evident from the foregoing Tables I to V inclusive, in carrying out our method and in operating the electrodialysis equipment described above, using membranes differing substantially in porosity, various factors are controlled to make possible the desired increase in efficiency. The batch operating cycle is initiated by the use of a concentrating solution containing a suitable inorganic acid (e.g., hydrochloric acid) and having a resistivity substantially greater than that of the whey. As previously explained in connection with FIG. 3, immediately after the commencement of the cycle and the application of electrical power, the electrical resistivity of the concentrating solution falls rapidly until it is substantially of the same value that as of the whey. The resistivity of the whey gradually increases over the period of the batch run which may be several hours. As the resistivity of the whey being treated increases, the resistivity of the concentrating solution is likewise gradually increased, as by gradual and progressive dilution with fresh water. Throughout the run the resistivity of the concentrating solution is maintained lower than and in a prescribed relationship to the resistivity of the whey. The voltage applied across each stack is likewise gradually increased during the period of the run and is at all times at maximum safe value. In a typical instance the voltage on each of the stacks at the beginning of the run may be of the order of 200 volts. At the end of the run the voltage across each of the stacks may be of the order of 400 to 440 volts.

Figure 7:
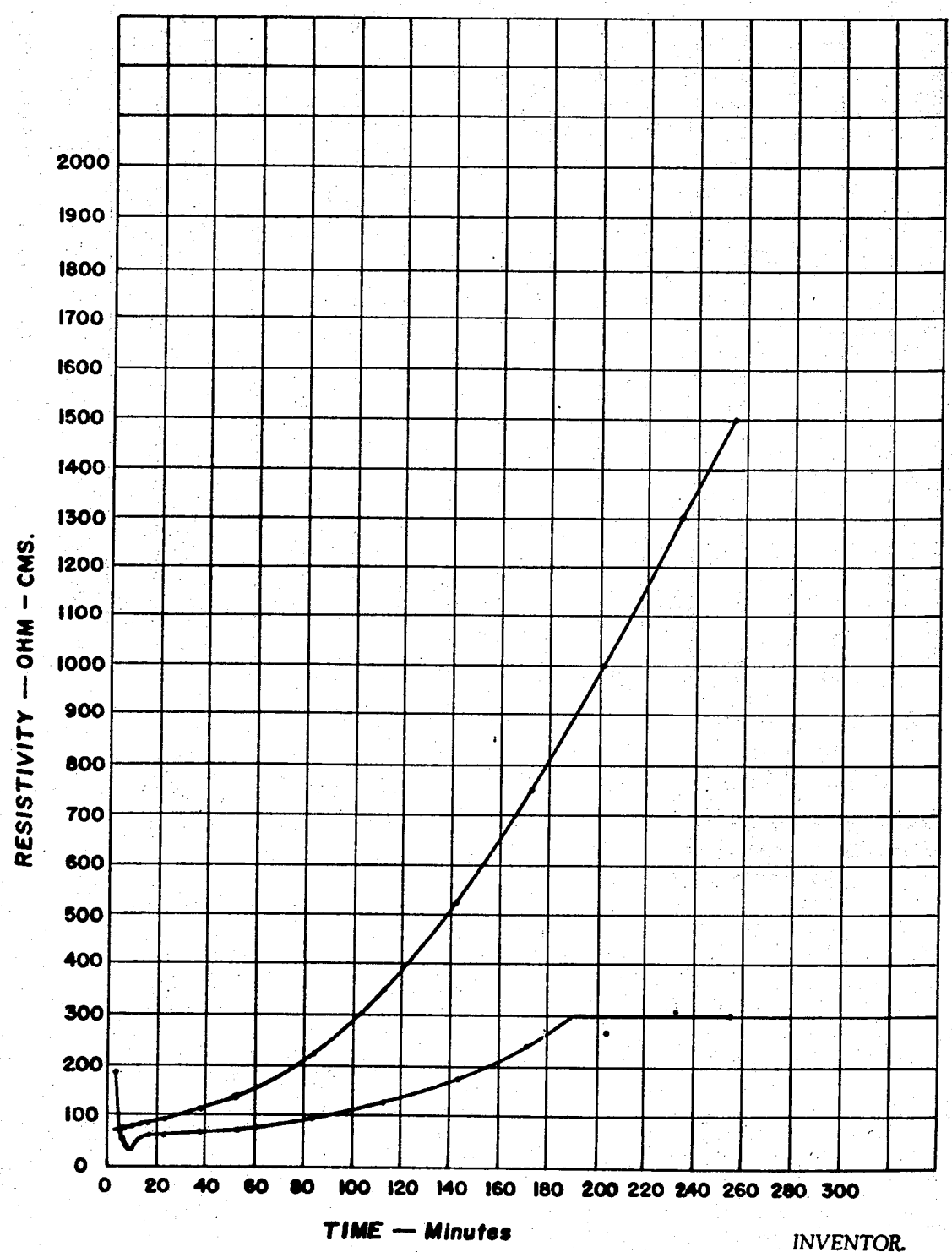
FIG. 7 shows whey and brine resistivity curves plotted from the data of Table No. IV.

FIG. 7 shows curves plotted from the data of Table IV, between resistivity on the vertical and time on the horizontal axis. Curve 1 is for the whey and curve 2 for the concentrating brine solution. The extremities of both curves (i.e., for the last 22 minutes of the run) were extrapolated from the plotted data. It will be noted that at the start of the run the resistivity of the brine was greater than that of the whey. However, the brine resistivity decreased rapidly to a value below that of the whey, and then gradually increased until the latter part of the run remaining substantially below that of the whey. During this latter part, which in this instance is about 65 minutes, the resistivity of the brine was maintained substantially constant by dilution. For most of the run (i.e., about 175 minutes of the 255 minute run) the resistivity of the brine varied from about 65% of that of the whey at the 15-minute point, to about 33% at the 190-minute point. Maintenance of the brine resistivity substantially constant for the last 65 minutes was deemed desirable to minimize back diffusion during the last part of the run. The data in Tables III and V show that without membranes differing in porosity, the resistivity of the brine was maintained constant for much longer times, namely about 134 and 92 minutes, respectively to minimize back diffusion. This requirement further served to decrease the overall efficiency potential which is obtained for the runs with type A and type B membranes, in comparison with the type A&B membranes.

Control is automated by use of a system such as shown in FIG. 3. The resistivity indicator 51 is responsive to the resistivity of the whey flow line entering the stack line, and the indication of resistivity thus obtained is used for controlling the resistivity of the brine by setting the control point of the brine resistivity controller, which then controls the introduction of fresh diluting water into the brine. Assuming that the applied voltage is controlled automatically, a suitable automatic voltage control means is employed which controls the voltage in accordance with the resistivity of the brine, which in turn is controlled in a fixed and predetermined relationship with the whey resistivity. Thus the whey resistivity controls brine resistivity which in turn controls the applied voltage, all in a fixed and predetermined relationship and within the limits of safe voltage application on the various stack components. In FIG. 3 the resistiivty sensing device for the whey stream is shown bewteen the feed tank 42 and the first electrodialysis stacn 41a. Because the incremental change in resistivity of the whey is relatively quite small in the course of one pass through the four stacks, it is equally feasible to place this sensing device at the discharge side of the last stack, or for that matter, before or after any one of the stacks. A simple adjustment in the programmed response settings of the controllers suffices to provide the optimum voltage and brine resistivity controls characteristics of this invention.

In general our method and apparatus makes for relatively high operating efficiency compared to conventional practice. The reduced membrane resistance obtained by virtue of using membranes differing in porosity results in reduced stack resistance, increased current density at the same applied voltage, and increased desalting rate. This is taken advantage of to obtain a high efficiency by the control factors employed, including the control of the resistivity of the concentrating solution with respect to the resistivity of the whey undergoing treatment in the manner explained in connection with FIG. 7, together with a gradual increase in applied voltage. As explained above, the programmed relationship between resistivity of the concentrating solution and the resistivity of the whey undergoing treatment as shown in FIG. 7 is maintained by sensing the resistivity of the whey undergoing treatment, and in accordance with such sensing the concentrating solution is diluted to maintain the desired relationship. Back diffusion which would tend to decrease efficiency is avoided by maintaining a relationship between resistivities such as shown in FIG. 7. Assuming that the voltage control is automated, it is under the control directly and indirectly of both recorder controllers 51 and 52, and which serve to adjust resistivity of the brine stream. The resistivity of the brine stream is controlled by the recorder controller 52 receiving information from the resistivity sensing device in the whey stream.

The controlled resistivity of the brine stream activates the voltage control.

As a more specific example of the invention, the whey employed was one produced in the manufacture of cheddar cheese having a hydrogen ion concentration of pH 6.0 and an ash content of 8.9%. The equipment employed comprised 4—100-pair cell stacks, each constructed in the manner previously described and connected to operate in series. Automated control means was employed as in FIG. 3. The working anion membranes were the previously mentioned type A (Code No. 111–EZL–219) with a moisture capacity of about 40.0%, and the cation membranes were the previously mentioned type B, (Code No. 61–AZL–183) having a moisture capacity of about 44.66%. The concentrating solution was water initially acidified to pH 2.8 with hydrochloric acid. Both whey and concentrating solution were initially heated to 100° F. and maintained at this temperature throughout the batch cycle. A batch of concentrate comprising 13,900 lbs. at 26.6% solids was prepared by vacuum evaporation, the pH adjusted to 6.3 and centrifuged to remove sediment. Flow of the whey and concentrating liquid was established through a series of stacks with continuous circulation of both concentrating solution and the whey. Initially the applied voltage across each of the stacks was 200 volts. The resistivity of the concentrating solution was initially 250 ohms-cms. and the resistivity of the whey was 50 ohms-cms. In the first 2 to 4 minutes of the cycle, the resistivity of the concentrating solution fell rapidly to about 55 ohms-cms., where it approximately equalled that of the whey. At this point fresh water was supplied to the concentrating solution and such controlled dilution of the solution continued during the run, whereby the resistivity of the concentrating solution throughout the batch cycle was maintained at a value lower than the resistivity of the whey but in a preferred relationship with the whey resistivity as shown in FIG. 7. The cycle was discontinued after a period of 4.27 hours. Over this period the resistivity of the whey gradually increased from the initial value of 50 ohms-cms., whereby at the end of the cycle it had a value of 1550 ohms-cms. At the end of the cycle the whey and concentrating solution were removed from the stacks, and thereafter the stacks were rinsed and cleaned for the next cycle. The percent yield obtained was 83.8% and the process rate was 6.98 lbs. starting solids per hour per sq. meter of membrane surface area. The treated product contained 0.16% calcium and 0.82% ash. The data tabulated in Table IV was that obtained in the foregoing example.

Although in the previous description we have referred only to the treatment of whey, it is deemed that the invention is applicable to a variety of liquid materials which have a mineral salt content consisting of various complex salts and solutes, together with dispersed organic material (e.g., proteinaceous materials, organic colloids, etc.). Examples of such materials are sugar syrups, including corn syrup, sugar cane syrup, sugar beet syrup, gluten containing liquids, and byproduct liquids obtained in the processing of various food products. Likewise in addition to whey other liquid dairy products can be treated to effect a reduction in mineral salt content, as for example, whey which has been modified by removal of some of its lactose content, or skim milk.

What is claimed is:
1. In a process for the treatment of aqueous liquid materials containing dispersed organic constituents for the removal of mineral salts therefrom, subjecting the liquid material over the period of an operating cycle to electrodialysis by flowing the same between spaced homogeneous anion and cation membranes, the membranes differing substantially as to porosity, applying an electrical voltage across the membrane pair, the voltage being applied through a concentrating solution maintained as flowing streams on the exterior faces of the membrane pair, continually increasing the resistivity of the concentrating solution with maintenance of the same at values less than that of the liquid material undergoing treatment, and progressively increasing the voltage applied to the stack during the run.

2. A process as in claim 1 in which the resistivity of the concentrating solution is controlled by continually obtaining an indication of the electrical resistivity of the material underoing treatment, and then subjecting the concentrating solution to controlled dilution to maintain the resistivity of the same at values less than that of the liquid material.

3. In a process for the treatment of whey for the removal of mineral salts therefrom, subjecting a batch of the whey to electrodialysis by recurrently flowing the same between spaced homogeneous anion and cation membranes during the period of an operating cycle, the membranes differing as to porosity by about 4% or more as determined by the moisture carrying capacity method, recurrently flowing a batch of concentrating solution as flowing streams on the exterior faces of the membrane pair, continually sensing the respective electrical resistivities of the whey and the concentrating solution during the course of an operating cycle, continually diluting the concentrating solution to maintain its resistivity at values slightly less than the resistivity of the whey, and gradually increasing the applied voltage during the course of the run, the increases in applied voltage being directly in response to increases in the resistivity of the concentrating solution and indirectly in response to increase in the resistivity of the whey.

References Cited

UNITED STATES PATENTS

| 2,631,100 | 3/1953 | Aten et al. | 99—57 |
| 2,758,965 | 8/1956 | Block et al. | 204—180 |
| 3,291,716 | 12/1966 | Cioffi | 204—301 |
| 3,369,906 | 2/1968 | Chen | 99—97 |
| 3,383,245 | 5/1968 | Scallet et al. | 127—53 |
| 3,440,159 | 4/1969 | McRae et al. | 204—180 |

OTHER REFERENCES

Ionics, "Stack Pack," Ionics Bulletin L–2 2nd ed., 1963.
Ionics, "Stack Pack," Ionics Bulletin L–25–2 1963.

JOHN H. MACK, Primary Examiner
A. C. PRESCOTT, Assistant Examiner